W. D. QUIGLEY.
HUB OR BUSHING.
APPLICATION FILED MAR. 8, 1916.
1,191,730.
Patented July 18, 1916.
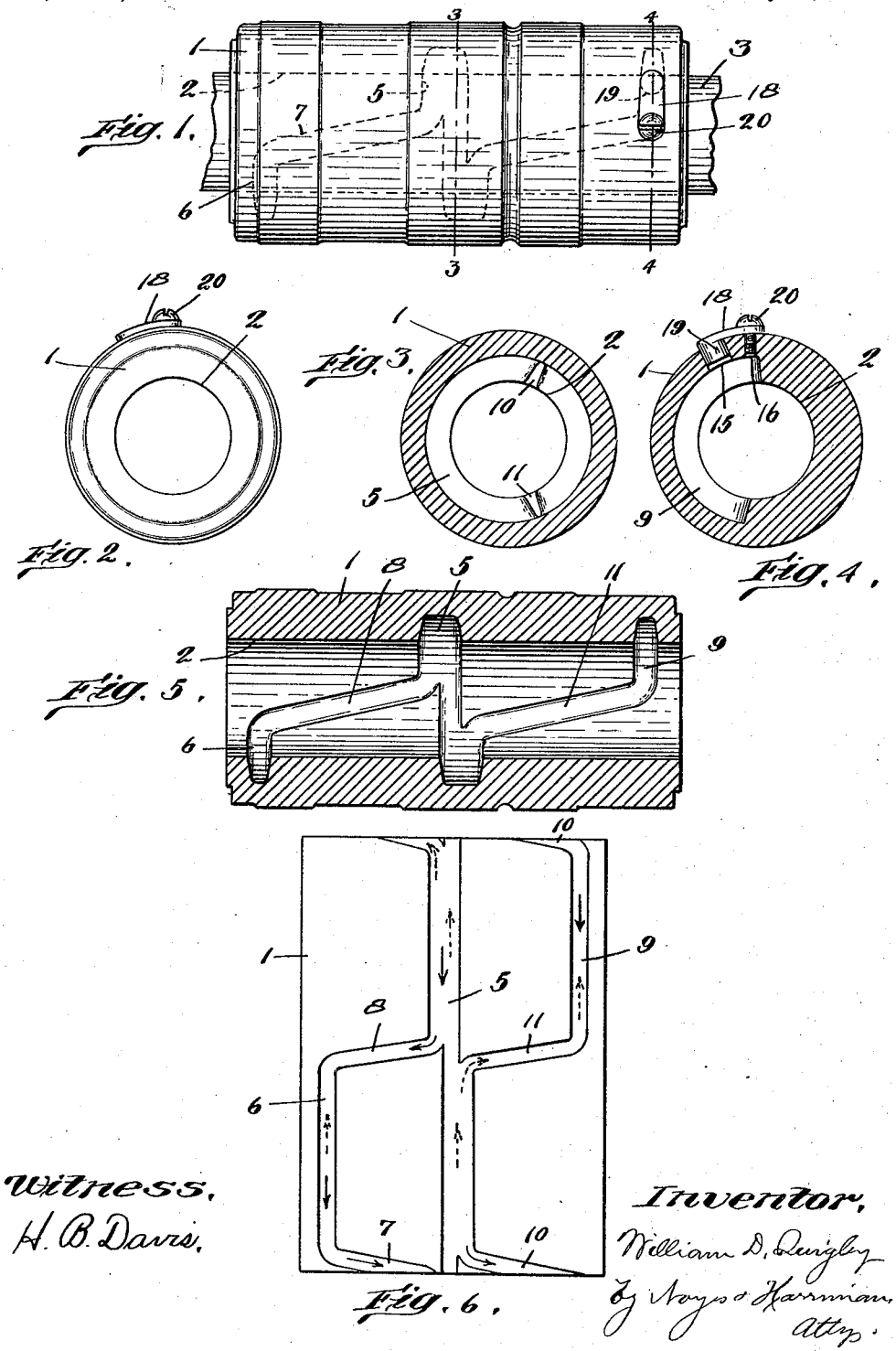

UNITED STATES PATENT OFFICE.

WILLIAM D. QUIGLEY, OF MELROSE, MASSACHUSETTS.

HUB OR BUSHING.

1,191,730.  Specification of Letters Patent.  Patented July 18, 1916.

Application filed March 8, 1916. Serial No. 82,915.

*To all whom it may concern:*

Be it known that I, WILLIAM D. QUIGLEY, a citizen of the United States, residing at Melrose, in the county of Middlesex and State of Massachusetts, have invented an Improvement in Hubs or Bushings, of which the following is a specification.

This invention relates to lubricating means for hubs and bushings, and has for its object the provision of means whereby oil is thoroughly distributed throughout the entire bearing surface of the bore, and is caused to circulate by the rotation of the hub or bushing, or shaft on which it is arranged.

The invention involves an arrangement of grooves formed in the surface of the bore, adapted not only to receive but to provide for the circulation of the oil.

Figure 1 is a side elevation of a hub or bushing embodying this invention. Fig. 2 is an end view of the same. Fig. 3 is a transverse section on the dotted line 3—3, Fig. 1. Fig. 4 is a transverse section on the dotted line 4—4, Fig. 1. Fig. 5 is a longitudinal vertical section of the same. Fig. 6 is a diagrammatical view of the bore of the hub or bushing.

The hub or bushing 1 may be of any desired shape and dimensions, it having a cylindrical bore 2 to receive a cylindrical shaft 3. On the surface of the bore 2, the oil receiving and circulating grooves are formed. In the arrangement here shown, there is provided a wide groove 5, which is annular and extends entirely around the bore transversely, and one-half of said groove is offset with respect to the other half, see Fig. 6. There is also a narrow groove 6, which is semi-annular and is arranged in parallel relation with the groove 5, and is in open communication or connected at its ends with the groove 5, by the narrow connecting grooves 7 and 8. These connecting grooves 7 and 8 are arranged diagonally to the axis of the hub or bushing, and are angularly related to each other. There is also provided a narrow groove 9, which is semi-annular, and is similar to the groove 6, and is arranged in parallel relation with the groove 5, and is in open communication or connected at its ends with the groove 5 by diagonally arranged narrow connecting grooves 10 and 11. The semi-annular grooves 6 and 9 are disposed at opposite sides of the main groove 5, and also at opposite sides of the bore.

In Fig. 6 a diagrammatical view of the grooves is represented wherein it will be seen that the grooves are arranged in the manner above described. By arranging the grooves 7 and 8, and 10 and 11, diagonally, as shown, as contrasted with arranging them in parallel relation with the axis of the hub or bushing, the oil is caused to circulate upon rotation of the hub or bushing or the shaft; and furthermore, deep grooves may be formed which will not weaken the hub or bushing; and furthermore, in case of wear, the diagonal grooves provide for the wearing of a circular hole, whereas grooves arranged in parallel with the axis would result in the wearing of an oblong hole. The oil passes along the main groove 5, and branches therefrom at one side through groove 7, and passes along the groove 6, and subsequently returns through groove 8, to the groove 5; and also branches from the groove 5 at the other side and passes through groove 11, and along the groove 9, and subsequently returns through groove 10, to the main groove 5. This description illustrates one method of operation.

To occasionally supply additional oil, a hole 15 is drilled through the wall of the hub or bushing which opens into one of the grooves to deliver oil thereto, and another hole 16 is drilled through the wall of the hub or bushing, near said oil hole, which, when open, serves as an air vent to enable a full supply of oil to be delivered. A single cover is or may be provided for said holes consisting of a short strip of metal 18, curved to conform to the arc of the hub or bushing, and having a cylindrical plug 19 adapted to enter one of said holes as the oil hole, for instance, and a screw 20 is employed to attach said strip to the hub or bushing which enters the other hole, which hole is provided with screw threads adapted to receive it. A single cover for the two holes insures the opening of the vent whenever oil is being supplied.

I claim:—

1. A hub or bushing having a cylindrical bore, and grooves in the surface of said bore adapted to receive and provide for the circulation of oil, there being a main groove extended entirely around the bore, and other grooves extending partly around the bore at each side of the main groove, which are in open communication with the main groove at each end.

2. A hub or bushing having a cylindrical bore, and grooves in the surface of said bore adapted to receive and provide for the separation of oil, there being a main groove extended entirely around the bore, and other grooves arranged at each side of said main groove and at opposite sides of the bore, which are in open communication with said main groove at each end.

3. A hub or bushing having a cylindrical bore, and grooves in the surface of said bore adapted to receive and provide for the circulation of oil, there being a main groove extending entirely around the bore, and semi-annular grooves similarly extended, which are in open communication with the main groove at each end.

4. A hub or bushing having a cylindrical bore, and grooves in the surface of said bore adapted to receive and provide for the circulation of oil, there being a main groove extending transversely entirely around the bore, and two semi-annular grooves arranged in parallel relation with the main groove and in open communication therewith at each end, said semi-annular grooves being disposed on opposite sides of the bore.

5. A hub or bushing having a cylindrical bore, and grooves in the surface of said bore adapted to receive and provide for the circulation of oil, there being a main groove extending entirely around the bore, and other grooves in open communication therewith at each end, the connecting groove for each of said other grooves being arranged diagonally with respect to the axis.

6. A hub or bushing having a cylindrical bore, and grooves in the surface of said bore adapted to receive and provide for the circulation of oil, there being a main groove extending entirely around the bore, and other grooves in open communication therewith at each end, the connecting groove for each of said other grooves being arranged diagonally with respect to the axis, and angularly related to each other.

7. A hub or bushing having a cylindrical bore, and grooves in the surface of said bore adapted to receive and provide for the circulation of oil, there being a main groove extending transversely entirely around the bore, and semi-annular grooves arranged in parallel relation with the main groove and at opposite sides of the bore, and grooves connecting the ends of said semi-annular grooves with the main groove, the connecting grooves at the ends of each semi-annular groove being arranged diagonally to the axis.

8. A hub or bushing having a cylindrical bore, and grooves in the surface of said bore adapted to receive and provide for the circulation of oil, there being a wide main groove extended entirely around the bore, a portion of which is offset with respect to the remainder, and other narrow grooves arranged at each side of said main groove and at opposite sides of the bore and in open communication with the main groove adjacent the junction of the offset portions thereof.

9. A hub or bushing having a cylindrical bore, and grooves in the surface of said bore adapted to receive and provide for the circulation of oil, there being a wide main groove extended entirely around the bore, a portion of which is offset with respect to the remainder, and other narrow grooves arranged at each side of said main groove and at opposite sides of the bore and in open communication with the main groove adjacent the junction of the offset portions thereof, the portions of said narrow grooves connecting them with the main grooves being arranged diagonally to the axis and angularly related to each other.

10. A hub or bushing having a cylindrical bore and grooves formed in said bore adapted to receive and provide for the circulation of oil, and also having an oil-hole and a vent-hole, said holes being adjacently disposed and opening into said grooves, and a single cover for said holes adapted to be detachably connected to the hub or bushing.

In testimony whereof, I have signed my name to this specification, in the presence of two subscribing witnesses.

WILLIAM D. QUIGLEY.

Witnesses:
B. J. NOYES,
H. B. DAVIS.